United States Patent [19]

Grawe

[11] 4,429,484
[45] Feb. 7, 1984

[54] ANIMAL SNARE SUPPORT

[76] Inventor: Ardell M. Grawe, Box 167, Rte. 2, Breckenridge, Minn. 56520

[21] Appl. No.: 402,091

[22] Filed: Jul. 26, 1982

[51] Int. Cl.³ ............................................. A01M 23/34
[52] U.S. Cl. ......................................................... 43/87
[58] Field of Search ............................................... 43/87

[56] References Cited

U.S. PATENT DOCUMENTS

| | | | |
|---|---|---|---|
| 1,402,753 | 1/1922 | Faifbanks | 43/87 |
| 2,537,894 | 1/1951 | Haviland | 43/87 |
| 2,683,952 | 7/1954 | Armstrong | 43/87 |
| 3,958,360 | 5/1976 | King | 43/87 |
| 4,083,142 | 4/1978 | Gregerson | 43/87 |

*Primary Examiner*—Gene P. Crosby
*Attorney, Agent, or Firm*—Kinney, Lange, Braddock, Westman & Fairbairn

[57] ABSTRACT

An animal snare support includes an upright shank portion, ground support structure integral with the shank for fixedly positioning the shank with respect to the ground, a substantially horizontal bar portion integral with and extending away from the shank at the top end of the shank, and a snare support collar integral with the horizontal bar portion. The support collar has an opening therethrough, the axis of which lies at an acute angle above the horizontal. An animal snare consisting of a length of flexible multi-filament steel snare wire has an anchor end portion extending through the snare support collar and a loop end portion extending outwardly from the collar. A snare lock encompasses the loop end portion and an intermediate portion of the wire to form a snare loop. When the snare is set, the snare lock will be positioned adjacent the snare support collar, and the axis of the snare wire then supporting the lock will lie at an acute angle above the horizontal.

6 Claims, 4 Drawing Figures

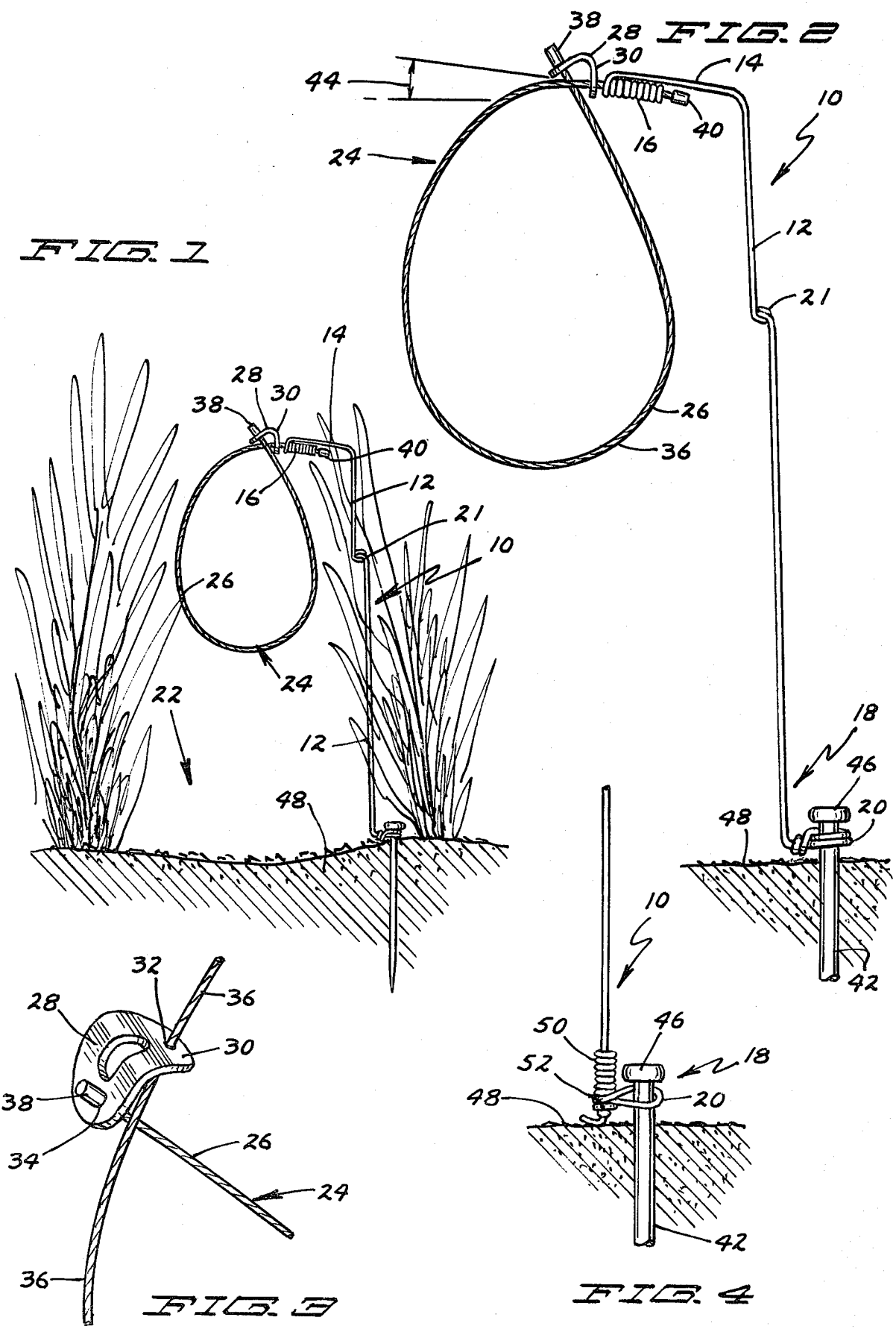

ANIMAL SNARE SUPPORT

BACKGROUND OF THE INVENTION

1. Field of the Invention

This invention has relation to animal snares in the form of flexible wire loops positioned along animal trails and elsewhere to intercept animals which are to be snared. The invention presents a support for such snares which serves to support the snare loop in such a position as to minimize the opportunity and chance for the loop to be lost before it is penetrated by an animal.

2. Description of the Prior Art

A preliminary search of this invention revealed only one patent, and it does not appear to be pertinent to the concept of this invention. It is U.S. Pat. No. 4,083,142 for ANIMAL SNARE to Gregerson, granted April 11, 1978. The patent discloses an animal snare including merely a length of multi-wire steel cable having a swivel connection at the anchor end thereof and having a snare lock of a particular design connected to the other end of the cable and encompassing a midportion of the cable to form a snare lock or cable lock 17. While the cable lock shown might work well in connection with tthe animal snare support of the present invention, there is no concept of supporting the snare loop in such a manner as to minimize loss of that loop before an animal is snared by it.

In addition to simply hanging a snare loop along an animal trail from above, as suggested by the disclosure of the Gregerson patent, it is known to use support wires fastened to trees or fence posts or anchored to the ground which stakes to position animal snare loops along game trails and elsewhere. Often, before the present invention, it was the multi-strand steel cable that was anchored to the tree, ground, or other permanent fixture with the support wire simply extending along the cable up to the point where the loop begins. At this point, a snare lock such as that shown herein and such as that shown in the Gregerson patent is placed adjacent the end of the support wire.

Before the present invention, great difficulty was encountered in designing the snare lock and positioning it in such a manner that it would not become dislodged to cuase loss of the snare loop before it was encountered by an animal to be snared.

The inventor and those in privity with him are aware of no prior art closer than that discussed above, and are aware of no prior art which anticipates the claims herein.

SUMMARY OF THE INVENTION

An animal snare support of the present invention supports a snare loop of flexible multi-filament steel snare wire and a snare lock forming the loop in such a manner that there is no tendency for the snare lock to slide or creep down the snare loop until such time as the loop is forceably encountered as, hopefully, by an animal to be snared placing its head through the loop and closing the loop and activating the snare lock with its upper body and shoulders.

The animal snare support includes a shank portion; a substantially horizontal bar portion integral with and extending away from the shank portion; and a snare support collar integral with the horizontal bar portion. The snare support collar is situated in surrounding relation to an anchored end of the flexible snare wire and is of length and configuration so as to support the axis of the surrounded portion of the snare wire in approximate concentric relationship with respect to the axis of the opening through the collar.

The relationship of the parts when the snare has been set is such that the axis of the opening provided in the snare support collar, and consequently, the axis of the flexible snare wire inside of the support collar and immediately beyond will be at an angle above the horizontal measured from the anchored end of the snare wire outwardly toward the loop end thereof.

A snare lock attached to the outer loop end of the snare wire and encompassing the snare wire in position immediately adjacent the snare support collar will maintain such position and will maintain the snare loop under the action of wind, snow, sleet, rain, accidental movement by passing animals, action of grasses and plants blowing in the wind, etc., etc. This is because any tendency thus generated for the snare lock to slide will cause it to slide back toward the support collar.

BRIEF DESCRIPTION OF THE DRAWINGS

FIG. 1 is an elevational view of the animal snare support of the invention shown in use supporting an animal snare in operative position along an animal trail;

FIG. 2 is an enlarged elevational view of the snare, snare support and ground support means of the invention with a snare support stake shown slightly withdrawn to more clearly demonstrate the construction of the ground support means;

FIG. 3 is an enlarged fragmentary view of portions of a loop of a snare illustrating a snare lock, thus detailing the structure that is held in place by the snare support when the snare is set for use as seen in FIGS. 1 and 2 along an animal trail; and FIG. 4 is a detailed view of a fragment of the animal snare support of the invention illustrating a swivel connection between it and a snare support stake and ground, the stake being shown slightly withdrawn to more clearly reveal the details of construction of the swivel.

DETAILED DESCRIPTION OF THE PREFERRED EMBODIMENTS

An animal snare support 10 includes an upright portion or shank 12, substantially horizontal upper bar portion 14 integral with and extending outwardly from the shank 12, a snare support collar 16 integral with the horizontal bar portion 14 and constituted as a plurality of adjacent contiguous tightly coiled loops of the wire of which the snare support 10 is made.

As most clearly seen in FIG. 2, the lower end of the snare support includes ground support means 18 consisting of an eyelet 20 integral with and formed from the lower end of the wire constituting the snare support 10, the eyelet extending away from the upright portion or shank 12 at approximately right angles thereto. As seen in FIGS. 1 and 2, in order to increase the stiffness of the upright portion or shank 12, one or more loops 21 can be integrally formed in the shank 12.

As seen in FIG. 1, the animal snare support 10 of the invention will be initially fastened along an animal trail 22 in such a manner as to support an animal snare 24 in position so that an animal passing along the trail can and will pass its head through a loop 26 of that animal snare.

Snare 24 includes a length of flexible, multifilament steel snare wire 36 having a first anchored end portion passing through collar 16 and being encompassed by a permanent anchor or slug 40 and a second loop end portion passing through a snare lock 28 and being encompassed by a permanent slug or anchor 38. An intermediate portion of snare wire 36 also passes through snare lock 28. The portion of the wire 36 between the two portions passing through the lock 28 forms a snare loop 26 of the animal snare.

The snare lock 28, when the snare is set, is positioned adjacent the snare support collar 16 and is supposed to stay there to maintain a full loop 26 until an animal encounters the snare. At that point the snare lock must slide freely down the loop to imprison the animal's neck and head in the now reduced snare loop.

There are a number of known snare locks, and the snare lock 28 is a part of the prior art. The snare lock shown is known as a washer lock and consists of a washer 30 bent at an acute angle as best seen in FIG. 2 and provided with a pair of snare holes 32 and 34 extending therethrough. When an animal in the loop causes the loop to tighten, the washer lock 30 slides down flexible steel wire 36 until it meets with a resistance. Usually this will be the neck of the trapped or snared animal. When the animal struggles to get loose and tends to force the snare lock or washer lock 28 back along the snare wire 36, the washer lock tends to pivot about its snare hole 32 and grips hard against the wire 36 resisting all efforts to move it back along the wire.

The animal snare support 10 of the invention can be made from several materials with good effect; but a number 9 black annealed wire has been found excellent for the purpose. This wire is stiff enough to support the snare indefinitely in the position as illustrated in FIGS. 1, 2 and 4. After the animal is snared, the malleable properties of the annealed wire will allow it to deform and bend as necessary to accommodate the movements of the trapped animal without breaking. While the snare support 10 is shown in a substantially vertical upright position, it is to be understood that, once the lower end is firmly supported with respect to the ground, the shank 12 of the snare support can be bent in any direction necessary to cause the snare to be properly positioned with respect to the animal trail or other location where the snare is to be set.

Once the trapper positions the snare, it is essential, if he is to make a catch, that the snare loop 26 stay in the open position in which it is set until it is encountered by an animal. In other words, in the case of small animals such as raccoons, coyotes, rabbits and the like, the height of the snare will be such that larger animals such as deer will simply step or jump over it.

Factors which tend to prematurely discharge the loop include wind, snow, rain, movement of grasses and branches causes by the wind, accidental jigglings by animals, either those intended to be trapped or others, etc., etc. A problem with the prior art devices including the use of upright snare supports is the tendency of the snare loops to be lost because of the above factors.

As seen in FIGS. 1 and 2, the flexible wire 36 extends through each of the snare wire holes 32 and 34 to form the loop 26 in the manner as most clearly indicated in FIG. 3.

To set the animal snare 24, the snare and snare support are transported to the location for use thereof, and a snare support stake 42 is passed through the eyelet 20 of the ground support means 18 and firmly driven down into the ground thus to hold the snare support 10 in its upright position as pictured in FIG. 1. The substantially horizontal bar portion 14, and with it the snare support collar 16 are, if necessary, bent with respect to the remainder of the animal snare support to position the axis of the opening of the snare support collar 16, and consequently the axis of that portion of the snare wire 36 extending through it at an angle above the horizontal as indicated at 44.

This angle is sufficient so that the portion of the snare wire 36 extending to the left as seen in FIG. 1 from the snare support collar extends upwardly at an angle above the horizontal. As can most clearly be seen in FIG. 2, this results in the snare washer lock being weighted down by the outer end of the snare loop so that the snare wire hole 32 will be crimped against the snare wire 36, thus preventing the snare lock from sliding down the wire 36 to cause loss of the loop 26 until such time as an animal runs headlong into the loop.

Without this snare wire being positioned to extend slightly upwardly from the horizontal, it can readily be understood that each and every motion of the snare loop due to the wind or whatever else would cause the washer lock to slide even imperceptively down the loop; and after a certain number of disturbances, the loop would be sufficiently lost so that it would no longer be effective for its intended purpose.

In FIG. 4 is illustrated a modified form of the invention. In that figure, as well as in FIG. 2, the snare support stake 42 is illustrated as being driven only partially into the ground. In actual practice, it is better to drive the stake clear down so that its head 46 is firmly holding the eyelet 20 against the ground 48.

In the form of the invention as seen in FIG. 4, the eyelet 20 is not integral with the upright portion or shank 12, but is connected in surrounding relationship to that shank by a snare support shank swivel collar 50 which extends around the bottom portion of the shank 12. As seen in FIG. 4, it is evident that the shank 12 and the entire animal snare support 10 including the substantially horizontal bar portion 14 and the snare support collar 16 are free to rotate in the swivel collar 50.

This modified form of the invention was developed to overcome the possibility that a trapped animal, in its struggles, could bend the wire back and forth so many times over the stake 42 that the wire would eventually be fatigued to the point where it would break off and allow the animal to move away from the snare site into the woods and then to permanent hiding.

In this modified form of the invention, a washer 52 is provided at the bottom of the upright portion or shank 12 to prevent the snare support shank swivel collar 50 from coming off of the end of the shank 12.

Although the present invention has been described with reference to preferred embodiments, workers skilled in the art will recognize that changes may be made in form and detail without departing froom the spirit and scope of the invention.

What is claimed is:

1. An animal snare support for use with an animal snare which includes a length of flexible snare wire having an anchored end and a loop end portion, a snare lock encompassing a first loop end portion and a second intermediate portion of the snare wire to form a snare loop in between, means to prevent the first loop end portion of the snare wire from escaping from the snare lock, the lock and snare wire being so constructed that the intermediate portion of the snare wire runs freely through the snare lock in direction to close the snare loop, the animal snare support including:

an elongate shank;

support means to affix a first end portion of said shank in fixed relation to the ground;

a substantially horizontal bar having a first end portion integral with a second end portion of the shank;

an elongated, hollow, snare support collar attached with respect to a second end portion of said bar and encompassing a portion of the flexible snare wire between the snare lock and the anchored end of snare wire, said collar being provided with an opening therethrough which has an axis lying at an acute angle above horizontal measured from the anchored end of the snare wire toward the loop end;

anchor means for preventing the anchored end of the snare wire from escaping from the support collar; and the relationship between the snare support collar encompassed portion of the flexible snare wire being such that the axis of the snare wire within and slightly beyond the snare support collar is held at an angle above horizontal in direction toward the loop end portion of the wire.

2. The snare support of claim 1 wherein:
said shank is generally upright and is made from a tough deformable wire;
said horizontal bar is an integral extension of the upper end of the shank;
said collar is an integral extension of said bar and is formed of tightly wound, closely spaced coils of the deformable wire.

3. The snare support of claim 2 wherein:
said support means to affix a first end portion of the shank to the ground includes:
 (1) an eyelet integral with said first end portion of said shank and extending outwardly therefrom to lie in a plane perpendicular to the first end portion of the shank, and
 (2) a headed snare support stake driven into the ground to hold the eyelet firmly to the ground.

4. The snare support of claim 2 wherein:
the support means to affix the first end portion of the shank to the ground includes:
 (1) an eyelet rotatably mounted with respect to said shank first end portion and extending outwardly therefrom to lie in a plane perpendicular to the shank first end portion, and
 (2) a headed snare support stake driven into the ground to hold the eyelet firmly to the ground.

5. The snare support of claim 4 wherein:
the eyelet is formed integrally with a shank support swivel collar situated in surrounding relation to said shank first end portion.

6. The snare support of claim 5 wherein:
the shank support swivel collar is constituted as a plurality of tightly wound, closely adjacent wire coils of deformable wire.

* * * * *